United States Patent [19]

Park

[11] Patent Number: 5,300,743
[45] Date of Patent: Apr. 5, 1994

[54] MICROWAVE COFFEE MAKER

[75] Inventor: Hwa S. Park, Kyungki, Rep. of Korea

[73] Assignee: Samsung Electronics Co., Ltd., Suwon, Rep. of Korea

[21] Appl. No.: 15,357

[22] Filed: Feb. 9, 1993

[30] Foreign Application Priority Data

Feb. 17, 1992 [KR] Rep. of Korea ............. 92-2264

[51] Int. Cl.$^5$ ............................................. H05B 6/80
[52] U.S. Cl. ........................... 219/689; 219/733; 99/DIG. 14; 99/306
[58] Field of Search ............ 219/10.55 R, 10.55 A, 219/10.55 E; 99/DIG. 14, 451, 706

[56] References Cited

U.S. PATENT DOCUMENTS

| | | | |
|---|---|---|---|
| 4,358,652 | 11/1982 | Kaarup | 219/10.55 A |
| 4,751,359 | 6/1988 | Jameison | 219/10.55 E |
| 4,900,886 | 2/1990 | Bridges | 219/10.55 E |
| 4,967,052 | 10/1990 | Krapf | 219/10.55 R |
| 4,999,466 | 3/1991 | Waligorski | 219/10.55 E |
| 5,028,753 | 7/1991 | Shariat | 219/10.55 E |
| 5,210,386 | 5/1993 | Sprunger | 219/10.55 E |

FOREIGN PATENT DOCUMENTS 1231829  1/1967  Fed. Rep. of Germany ... 219/10.55 A

*Primary Examiner*—Philip H. Leung
*Attorney, Agent, or Firm*—Burns, Doane, Swecker & Mathis

[57] ABSTRACT

A microwave coffee maker includes a magnetron for generating microwaves that heat water flowing in a conduit toward a filtering vessel. A high voltage transformer is connected to the magnetron. The conduit extends in heat exchange relationship with the magnetron and transformer so that water flowing in the conduit absorbs heat from, and thereby cools, the magnetron and transformer.

14 Claims, 2 Drawing Sheets

MICROWAVE COFFEE MAKER

BACKGROUND OF THE INVENTION

The invention relates to a microwave coffee maker in accordance for producing a coffee beverage, in which water is supplied with the Siphon principle and boiled by induction heat from microwaves generated by a magnetron.

PRIOR ART

Generally, a coffee maker is designed to heat a supply of water by means of induction heating using a magnetron, whereby the heated water flows into an upper filter box by means of a siphoning action and the coffee liquid produced through the filter box drips into a coffee container below.

However, this design is inconvenient where the coffee maker comprises a coffee container provided with a coffee filter box located thereabove, because the coffee liquid contained in the container boils up and overflows as heating progresses or conversely, the coffee liquid needs to be reheated when it cools over time. Especially, a microwave coffee maker as described above where the coffee maker comprises a magnetron generating microwaves and a high-voltage transformer supplying the necessary voltage for the magnetron, a significant amount of heat is produced and thus a cooling means using propeller type air circulation device is necessary. The cooling means increases electric mechanism parts such as the a cooling fan motor and so on, and thus the structure is more complicated and the cost of production rises as well as the noise from the fan motor.

The present invention was devised by considering the above matter, and it produces a microwave coffee maker capable of maintaining the special taste and flavor of coffee by keeping the coffee container warm and simultaneously cooling the high-voltage transformer and the magnetron without a cooling fan.

This object is accomplished by making water flow around the high-voltage transformer and the magnetron and also coating the lower portion of the coffee container with a microwave absorbing/heating material. In other words, a water supply pipe from the water storage tank provided at the upper portion of the coffee container is connected to a cooling member surrounding the high-voltage transformer, whereby the water supply pipe surrounds the high-voltage transformer in order to exchange heat. Also, the water supply pipe from the cooling member is designed to go around a magnetron and bridge the heating pipe so that the cooling of the magnetron can be accomplished. Additionally, the water is quickly heated in the heating pipe because it is supplied at a high temperature into the heating pipe by itself exchanging heat with the high-voltage transformer and the magnetron. Another positive feature of this present invention is that a separate installation of the coffee container and the filter box prevents the coffee liquid from overflowing due to the heat.

DETAILED DESCRIPTION OF THE INVENTION

A more detailed description, accompanying the attached drawings, follows.

Figure 1:
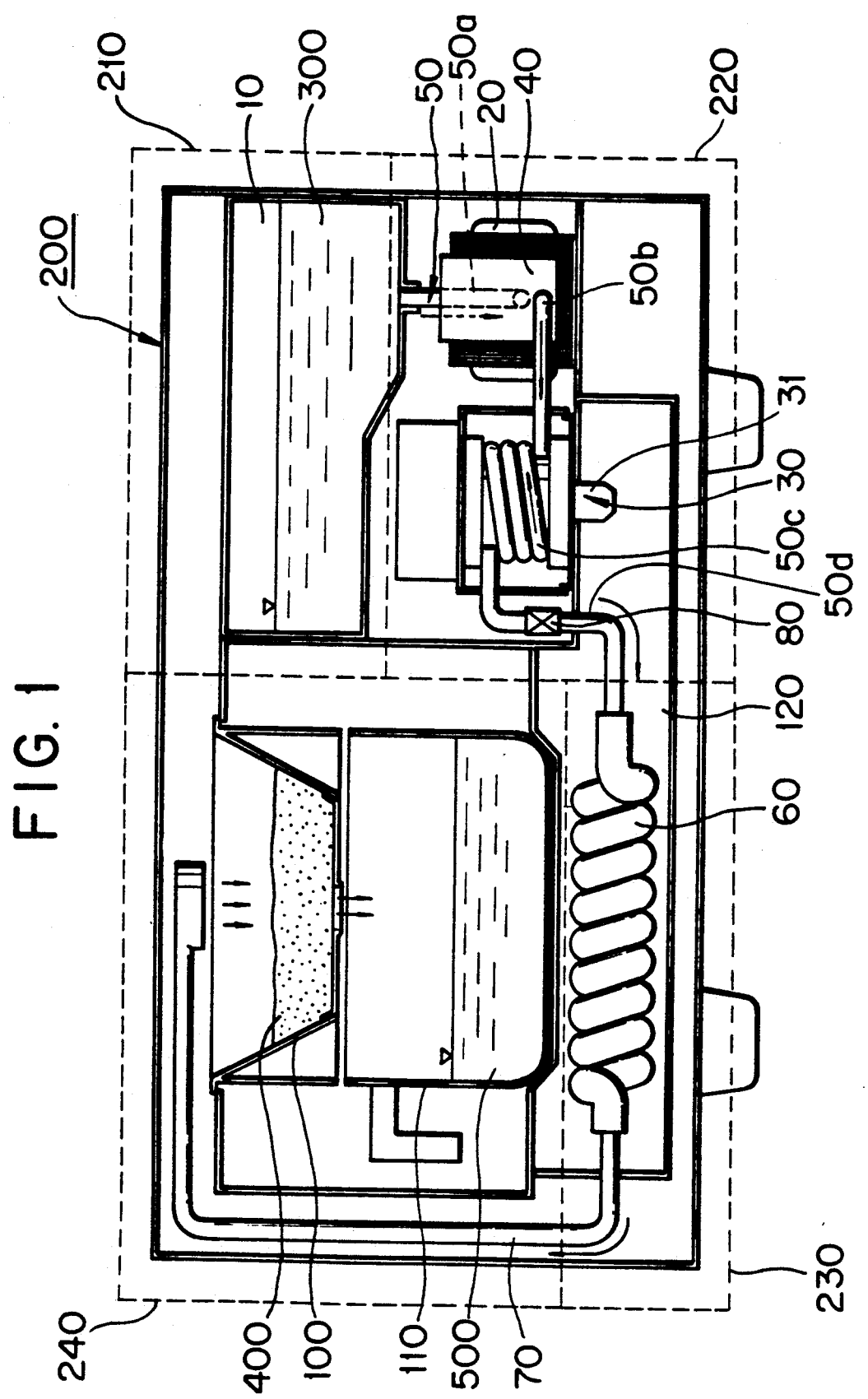
FIG. 1 is a vertical sectional view of the present invention.
Figure 2:
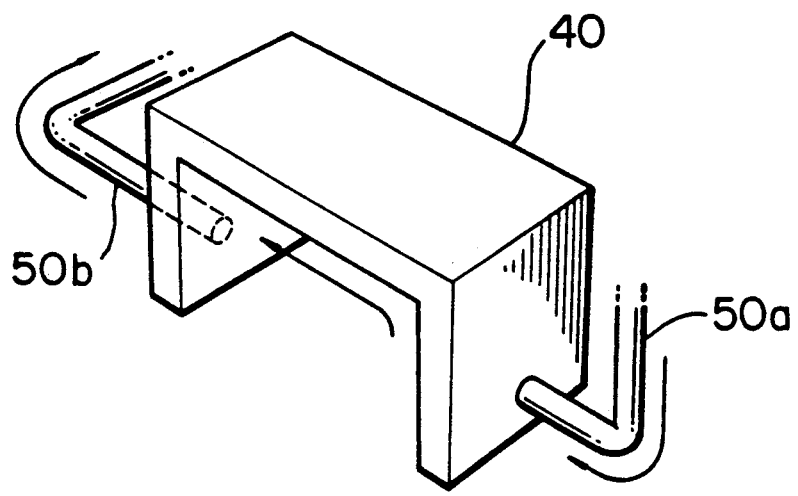
FIG. 2 is a perspective view of a transformer cooling member.
Figure 3:
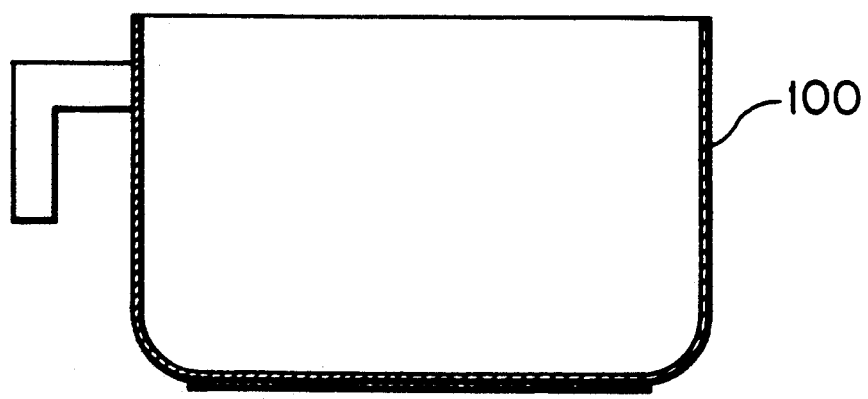
FIG. 3 is a sectional view of a coffee container.

FIG. 1 is a complete structural view showing an embodiment of the present invention. A coffee maker 200 comprises four portions, namely a water storing chamber 210, a mechanism chamber 220, a heating coffee chamber 230 for heating water for coffee and a coffee making chamber 240.

In the right side of FIG. 1, a water storing chamber 210, installed in the upper part of a mechanism chamber 220, holds water that is supplied from the exterior. The mechanism chamber 220 is below a water storing tank 10, and a magnetron 30 and a high voltage transformer 20 are appropriately arranged therein.

The heating chamber 230 comprises a heating pipe 60 (helical pipe) transiently storing the water supplied from the water tank to be heated and then supplied to the coffee maker 240 through a siphon pipe 70, and an antenna 31 of the magnetron 30 generating a microwave therein.

The coffee making chamber 240 is provided with a coffee filtering vessel 100 directly receiving heated water from the heating chamber 230, and at the same time, accepting and filtering coffee, and a coffee container 110 storing the coffee after it has passed through the filter vessel.

Details will now be explained more concretely as follows.

The high voltage transformer 20 thereof the cooling generates high voltage, and the magnetron 30 produces microwaves by the high voltage. A U-shaped cooling member 40 surrounding the high voltage transformer 20 is connected to the lower part of said water storing tank 10 by a section 50A of a supplying pipe 50. Another section 50b of the supplying pipe is connected to the other side of the member 40 and is joined to a helical segment 50c of the supplying pipe. The segment 50c winds around the magnetron 30 and is joined to a connecting segment 50d which connects to the heating pipe 60. The supply water 300 flows from the water storing tank through the supplying pipe and passes through the cooling member 40 which extends around the high voltage transformer 20 then travels around the magnetron in heat exchanging relationship with the high voltage transformer 20 and the magnetron 30.

The water supply pipe segment 50c winding around the magnetron 30 is connected to the heating pipe 60 that is heated by the microwave generated from antenna 31. The heating pipe 60 is designed in a helical form in order to create more calories in a narrow area. The outlet side of the heating pipe 60 is connected to a siphon pipe 70 that is elongated in the upper section along a wall of the coffee container 110. And the pipe is designed to extend to the upper section of the coffee filtering vessel 100, whereby the water supply water 300 heated in the heating pipe 60 drops into the coffee filtering vessel 100. It will be appreciated that the supplying pipe, cooling member 40, heating pipe 60, and siphon pipe 70 constitute portions of a water conduit arrangement extending between the tank 10 and the filtering vessel 100.

The coffee filtering vessel 100 is supplied with a lower section that can be centered for receiving thereof for the heated supply water 300 heated in the passing through the siphon pipe 70 and discharged through. Additionally, said coffee filtering vessel 100 is separate from the coffee container 110 to protect the water supply from reverseflowing or the coffee from overflowing.

The connecting segment 50d of the supply pipe 50 contains a reverse flow preventing valve 80 to prevent the reverse flow of the supply water 300 caused by the increase in pressure as it is heated.

The supply water 300 of the microwave coffee maker according to the present invention circulates around the high voltage transformer 20 and the magnetron 30 and exchanges heat with them to cool them. And simultaneously, the water absorbs the heat and rises in temperature to be supplied into the heating pipe 60 in the heated condition. Because its temperature is increased, the supply water in the heating pipe 60 is quickly heated by the microwaves generated from the antenna 31 of the magnetron. And pressure rises according to the temperature. The supply water is prevented from reverse flowing into the mechanism chamber 220 but rather is expelled into the low pressure siphon pipe 70 and flows into the coffee filtering vessel 100 and through the coffee powder 400. The coffee liquid 500 flows into the coffee container 110 for storage.

The microwave coffee maker according the present invention, as described above, can be more simply provided in design because it uses the supply water to cool the high voltage transformer and the magnetron and thus the need for a separate cooling fan or a motor for cooling is eliminated, and also the noise emitted from the motor is avoided. Especially, its design can lower the cost of production and the supply water for coffee is more quickly heated, because it flows into the heating chamber in the heated state, rather than being directly heated, and thus the energy consumption is reduced.

The water cooling method of the high voltage transformer and the magnetron can be demonstrated in a cooker using such parts. Therefore, this invention is a progressive invention.

What is claimed is:

1. A microwave water heater for supplying heated water to a coffee-filtering vessel, comprising
   a housing forming a water-storing chamber, a mechanism chamber, and a heating chamber,
   said water storing chamber adapted for storing water to be used for making coffee;
   said mechanism chamber including:
   microwave-generating means for generating microwaves and being coupled into said heating chamber, and
   cooling means for cooling said microwave-generating means by heat transfer with water circulated from said water storing chamber;
   said heating chamber including a heating pipe for receiving water from said cooling means, said heating pipe arranged in a path of microwaves from said microwave-generating means for heating water therein; and a siphon pipe connected to said heating pipe for conducting the heated water to a hot water outlet to be discharged into a coffee-filtering vessel for making coffee.

2. A microwave water heater according to claim 1, wherein said microwave generating means comprises a magnetron and a transformer, said cooling means comprising a conduit arranged to circulate water from said water storing chamber in proximate relationship with said magnetron and transformer.

3. A microwave coffee maker comprising:
   a coffee filtering vessel;
   a water conduit arrangement for supplying water to said filtering vessel for making coffee;
   a magnetron arranged to generate microwaves for heating water flowing through said water conduit arrangement; and
   a high voltage transformer connected to said magnetron;
   said water conducting arrangement disposed in heat exchanging relationship with said magnetron and said transformer to heat water flowing through said water conducting arrangement while defining a cooling means for said magnetron and said transformer, said water conducting arrangement being disposed so that water flowing therethrough cools said magnetron and said transformer before being heated by the microwaves from said magnetron; and
   said water conducting arrangement including a water outlet disposed above said coffee filtering vessel to discharge the heated water into said coffee filtering vessel for making coffee.

4. A microwave coffee maker according to claim 3, wherein said water conduit arrangement extends around said magnetron and said transformer.

5. A microwave coffee maker according to claim 4, wherein said water conduit arrangement includes a helical section winding around said magnetron.

6. A microwave coffee maker according to claim 4, wherein said water conduit arrangement includes a U-shaped member extending around said transformer.

7. A microwave coffee maker according to claim 3, wherein said water conduit arrangement comprises a helical heating section arranged to be subjected to microwaves generated by said magnetron.

8. A microwave coffee maker according to claim 3, wherein said water conduit arrangement includes first and second sections arranged in heat exchanging relationship with said magnetron and said transformer, respectively, and an additional section arranged to be subjected to microwaves generated by said magnetron, said additional section being disposed downstream of said first and second sections and separated therefrom by a check valve which prevents heated water from flowing upstream.

9. A microwave coffee maker according to claim 3, wherein said water conduit arrangement includes a siphon pipe extending to said water outlet.

10. A microwave coffee maker according to claim 3, including a coffee container disposed beneath said filtering vessel for receiving coffee liquid therefrom, said coffee container being separate from said filtering vessel.

11. A microwave coffee maker comprising:
    a water storage tank;
    a coffee filtering vessel;
    a magnetron arranged to generate microwaves;
    a high voltage transformer connected to said magnetron; and
    a water conduit arrangement for supplying water from said water storage tank to said filtering vessel for making coffee, comprising:
    first and second sections extending around said magnetron and transformer, respectively, for absorbing heat therefrom to heat water flowing in said first and second sections and to cool said magnetron and transformer, a third section disposed downstream of said first and second sections and being arranged to be subjected to microwaves generated by said magnetron to heat water flowing through said third section, a siphon section arranged downstream of said third section for siphoning heated water from said third section and discharging it into said filtering vessel for making coffee, and a check valve disposed downstream of said first and second sections and upstream of said third section for preventing heated water from flowing upstream.

12. A microwave coffee maker according to claim 11, wherein said third section is helical.

13. A microwave coffee maker according to claim 12, wherein said first section is helical.

14. A microwave coffee maker according to claim 13, wherein said second section is U-shaped.

* * * * *